H. C. NELSEN.
LATHE CHUCK.
APPLICATION FILED NOV. 13, 1909.

965,216.

Patented July 26, 1910.
2 SHEETS—SHEET 1.

Witnesses:
Howard L. Holcomb
Josephine K. Strempfer

Inventor:
Hans Christian Nelsen,
by Harry P. Williams
atty.

THE NORRIS PETERS CO., WASHINGTON, D. C.

H. C. NELSEN.
LATHE CHUCK.
APPLICATION FILED NOV. 13, 1909.

965,216.

Patented July 26, 1910.

2 SHEETS—SHEET 2.

Witnesses:
Howard L. Holcomb
Josephine M. Strempfer.

Inventor:
Hans Christian Nelsen
Harry P. Williams
att'y.

UNITED STATES PATENT OFFICE.

HANS C. NELSEN, OF HARTFORD, CONNECTICUT.

LATHE-CHUCK.

965,216.   Specification of Letters Patent.   Patented July 26, 1910.

Application filed November 13, 1909. Serial No. 527,822.

*To all whom it may concern:*

Be it known that I, HANS C. NELSEN, a subject of the Emperor of Germany, residing at Hartford, in the county of Hartford and State of Connecticut, have invented a new and useful Improvement in Lathe-Chucks, of which the following is a specification.

This invention relates to those lathe chucks which have jaws that are moved radially inward and outward on the front face for clamping and releasing stock to be worked, by means of a scroll that engages teeth in the backs of the jaws.

The object of the invention is to provide a chuck of this nature with simple means for quickly and powerfully moving the chuck jaws in either direction.

Figure 1:
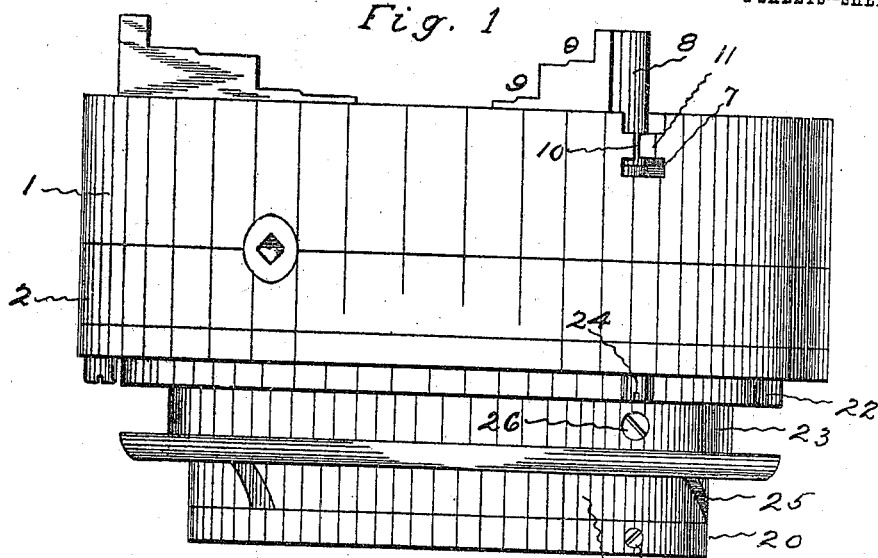
Figure 2:
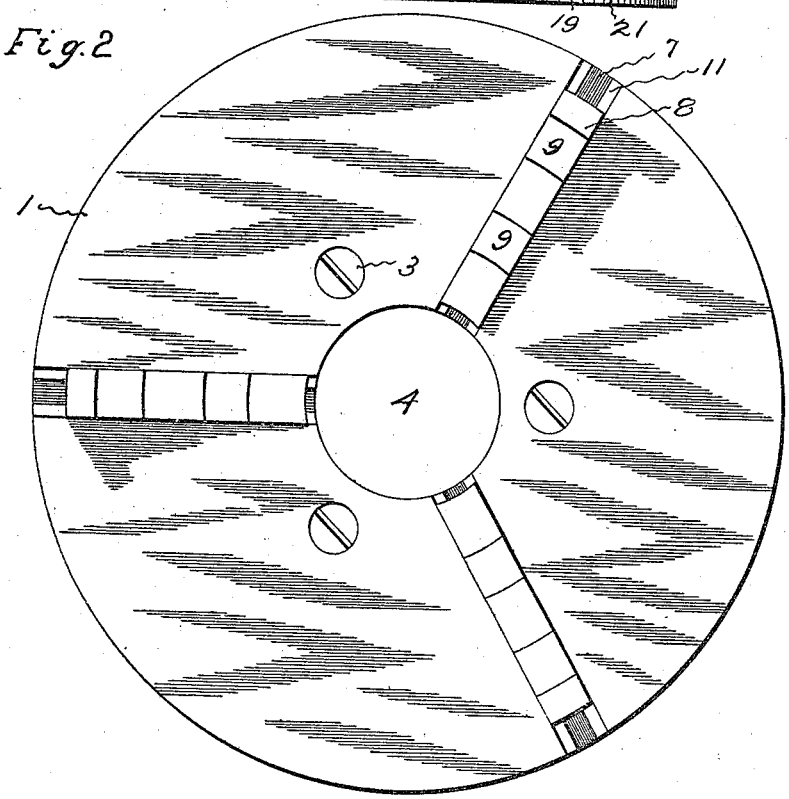
Figure 3:
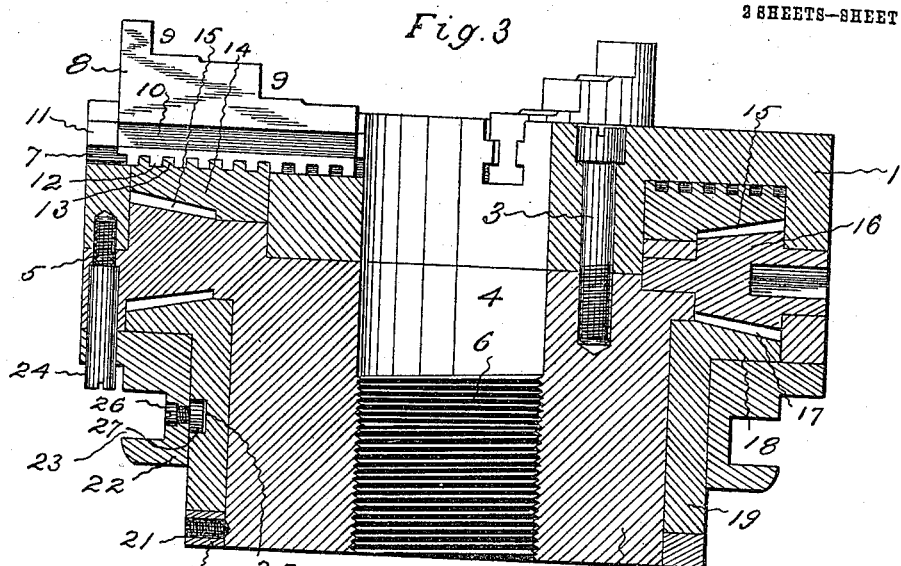
Figure 4:
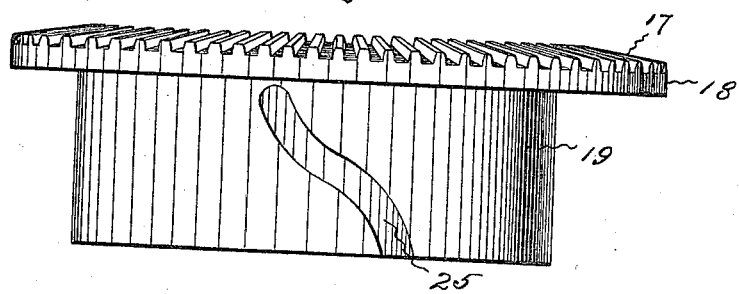
Figure 5:
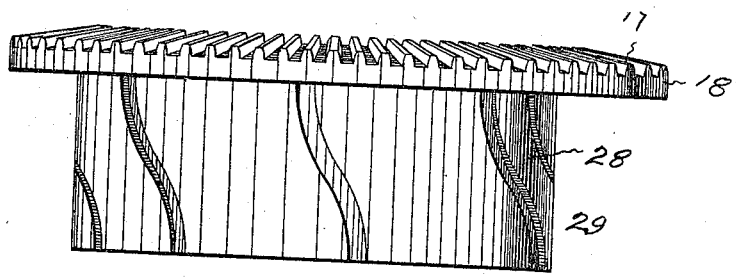

Figure 1 of the accompanying drawings is a side view of a chuck which embodies this invention. Fig. 2 is a view looking at the jaw face of this chuck. Fig. 3 shows a diametrical section of the chuck. Fig. 4 shows a plan of a sleeve which may be used for moving the scroll that engages the chuck jaws. Fig. 5 shows a plan of a modified form of sleeve for this purpose.

The body of the chuck which is illustrated, has a front member 1 and a rear member 2. These members are secured together by a suitable number of screws 3, that extend from the front member into the rear member, adjacent to the central opening 4, and by a suitable number of screws 5 that extend from the rear member into the front member near the periphery. A portion of the central opening in the rear member has threads 6 to provide means for the attachment of the chuck to the threaded end of a lathe spindle.

Movable in radial mortises 7 in the front face of the front member of the body are the jaws 8. These jaws have the usual steps 9 so that they will engage pieces of stock of different diameters, and they are provided with grooves 10 which fit tongues 11 in the mortises for guiding and holding the jaws in place. The back edges of the jaws are provided with teeth 12, and meshing with these teeth are scroll teeth 13 on the front face of a disk 14, which is loosely mounted in the front member of the body. On the back of the scroll disk near the periphery are beveled gear teeth 15. Any desired number of beveled pinions 16, preferably three, are arranged equal distances apart between the two members of the body. These pinions mesh with the teeth 15 on the back of the scroll disk, and they also mesh with teeth 17 on the front face of the flange 18 that projects from the front edge of the sleeve 19. This sleeve is loosely mounted on the rear member of the body, and is held from displacement by a ring 20 fastened back of it on the end of the body by a suitable number of set screws 21.

Mounted so that it will move back and forth on the sleeve is a collar 22. This collar has a groove 23, which is designed to receive the forked end of a lever for moving it back and forth. The collar is guided in its movement back and forth and prevented from rotation with relation to the body members of the chuck, by the stems 24 of the screws 5. In the periphery of the sleeve are spiral grooves 25, and projecting from the collar into these grooves are screw studs 26 bearing rolls 27 which are of such size as to fit the walls of the spiral grooves. There may be any desired number of these grooves in the sleeve and studs and rolls projecting from the collar.

When the collar is moved in one direction, the studs and rolls in the spiral grooves cause the sleeve to be rotated in one direction with relation to the body. When the collar is moved in the other direction, the studs and rolls in the grooves causes the sleeve to be given a rotation in the opposite direction. The rotatory movements of the sleeve, which are imparted in this manner by the movements back and forth of the collar, are transmitted through the beveled pinions to the scroll disk, the teeth of which engage the teeth on the backs of the jaws. By this means the jaws are moved outwardly when the collar is moved in one direction, and are moved inwardly when the collar is moved in the opposite direction. Instead of providing the sleeve which is rotarily mounted upon the rear member of the body of the chuck, with grooves, the periphery of this sleeve may be provided with spiral teeth 28, as is the sleeve 29 shown in Fig. 5. Studs may be arranged to engage these spiral teeth as previously described, or the interior of the collar may be provided with corresponding spiral teeth.

The invention claimed is:

1. A lathe chuck having a body, jaws movable radially of the body, a scroll disk engaging the jaws, pinions for rotating the scroll disk, a sleeve rotatorily mounted on the body and engaging the pinions, and means for rotating the sleeve.

2. A lathe chuck having a body, jaws movable radially of the body, said jaws having teeth on their back edges, a disk with a scroll engaging the jaw teeth on the front side, and with gear teeth on the back side, pinions engaging the teeth on the back of the scroll disk, a sleeve rotatorily mounted on the body and having teeth engaging the pinions, and means for rotating the sleeve.

3. A lathe chuck having a body, jaws movable radially of the body, said jaws having gear teeth on their back edges, a disk with a scroll on its front face, said scroll engaging the jaw teeth, and with gear teeth on its back face, pinions engaging the gear teeth on the back of the scroll disk, a sleeve rotatorily mounted on the body and having teeth engaging the pinions, a collar movable longitudinally of the body on the sleeve, and means connecting the collar and the sleeve, whereby the longitudinal movement of the former imparts a rotatory movement to the latter.

4. A lathe chuck having a body, jaws movable radially of the body, a scroll for moving the jaws, pinions engaging the scroll, a sleeve with teeth engaging the pinions, a collar movable longitudinally of the body mounted on the sleeve, said sleeve having spiral grooves, and studs and rolls connected with the collar and lying in said grooves, whereby the longitudinal movement of the collar imparts a rotatory movement to the sleeve.

5. A lathe chuck having a body formed of two members, jaws movable radially of the front member, said jaws having scroll teeth on their back edges, a disk located in the front member of the body, said disk having a scroll on its front face engaging the jaw teeth, and gear teeth on its back face, pinions mounted in the rear member and engaging the gear teeth on the back of the scroll disk, a sleeve rotatorily mounted on the rear member of the body, a flange projecting from the front end of the sleeve, said flange having gear teeth engaging the pinions, a collar movable longitudinally of the body on the sleeve, means for preventing the rotation of the collar with relation to the body, and means connecting the collar and the sleeve, whereby the longitudinal movement of the former imparts a rotatory movement to the latter.

HANS C. NELSEN.

Witnesses:
JOSEPHINE M. STREMPFER,
H. R. WILLIAMS.